United States Patent
Stolzer et al.

(10) Patent No.: US 10,906,109 B2
(45) Date of Patent: Feb. 2, 2021

(54) BAND SAW MACHINE

(71) Applicant: KEURO Besitz GmbH & Co. EDV-Dienstleistungs KG, Achern (DE)

(72) Inventors: Armin Stolzer, Baden-Baden (DE); Sonke Florian Krebber, Baden-Baden (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 48 days.

(21) Appl. No.: 16/115,659

(22) Filed: Aug. 29, 2018

(65) Prior Publication Data

US 2019/0061027 A1 Feb. 28, 2019

(30) Foreign Application Priority Data

Aug. 31, 2017 (DE) .................. 10 2017 120 087

(51) Int. Cl.
*B23D 55/04* (2006.01)
*B23D 55/08* (2006.01)
*B23D 53/08* (2006.01)

(52) U.S. Cl.
CPC ......... *B23D 55/046* (2013.01); *B23D 55/088* (2013.01); *B23D 53/08* (2013.01)

(58) Field of Classification Search
CPC ...... B23D 55/00; B23D 55/04; B23D 55/046; B23D 55/08; B23D 55/082; B23D 55/086; B23D 55/088
USPC .................. 83/704–706, 708–712, 404.2, 35
See application file for complete search history.

(56) References Cited

U.S. PATENT DOCUMENTS

| | | | |
|---|---|---|---|
| 3,764,126 A | 10/1973 | Arenas | |
| 4,922,777 A | 5/1990 | Kawabata | |
| 5,320,016 A * | 6/1994 | Spath | B23D 53/04 83/801 |
| 6,688,197 B1 * | 2/2004 | Niemela | B23D 53/001 144/28.6 |
| 2002/0157518 A1 * | 10/2002 | Jung | B27B 5/065 83/707 |

(Continued)

FOREIGN PATENT DOCUMENTS

| | | |
|---|---|---|
| CN | 103286381 | 11/2013 |
| DE | 102013210573 | 12/2014 |
| EP | 0443122 | 12/1990 |

*Primary Examiner* — Andrea L Wellington
*Assistant Examiner* — Richard D Crosby, Jr.
(74) *Attorney, Agent, or Firm* — Volpe Koenig (57) ABSTRACT

A band saw machine for sawing metallic workpieces, having a lower saw part and an upper saw part with two carrying wheels mounted therein, and a saw band that revolves with a cutting motion around the wheels that passes through a cutting region. A feeding device attached to the lower saw part feeds workpieces to the cutting region and/or into a sawing plane, in which the cutting region of the saw band is moved in a saw advance motion. The feeding device has a movable holder for detachably fastening the workpiece, and the holder, starting from an initial position, is movable both with translational and rotational motions. The saw band is guided through the cutting region, and the holder is moved translationally against the cutting region in order to execute the saw advance motion. Here, the workpiece is preferably turned by the holder such that its upper side faces downward.

12 Claims, 8 Drawing Sheets

(56) References Cited

U.S. PATENT DOCUMENTS

| | | | | |
|---|---|---|---|---|
| 2006/0037449 A1* | 2/2006 | Lavallee | B26D 3/166 | 83/54 |
| 2007/0101851 A1* | 5/2007 | McIntosh | B23D 53/006 | 83/788 |
| 2009/0007437 A1* | 1/2009 | Tokiwa | B23D 59/001 | 30/380 |
| 2009/0288540 A1* | 11/2009 | Yeh | B23D 53/00 | 83/788 |
| 2010/0031798 A1* | 2/2010 | Wang | B27B 15/08 | 83/800 |
| 2011/0138983 A1* | 6/2011 | Clark, II | B63B 35/03 | 83/801 |
| 2011/0185875 A1* | 8/2011 | Dale | B23D 51/025 | 83/820 |
| 2012/0037276 A1* | 2/2012 | Granberg | B27B 17/005 | 144/378 |
| 2013/0112054 A1* | 5/2013 | Chiao | B23D 55/046 | 83/39 |
| 2014/0216219 A1* | 8/2014 | Chiao | B23D 55/043 | 83/13 |
| 2014/0360322 A1* | 12/2014 | Oberle | B23D 53/04 | 83/13 |
| 2015/0020660 A1* | 1/2015 | Jeng | B23D 59/001 | 83/74 |
| 2015/0114201 A1* | 4/2015 | Seto | B26D 1/54 | 83/820 |
| 2015/0273598 A1* | 10/2015 | Waida, Jr. | B23D 53/08 | 83/13 |
| 2015/0375316 A1* | 12/2015 | Seto | B23D 55/082 | 83/813 |
| 2016/0039022 A1* | 2/2016 | Carden | B27B 15/02 | 83/73 |
| 2016/0158857 A1* | 6/2016 | Sakai | B23D 55/082 | 83/813 |
| 2018/0169775 A1* | 6/2018 | Stolzer | B23D 55/043 | |
| 2019/0143550 A1* | 5/2019 | Stolzer | B26D 5/005 | 83/39 |

* cited by examiner

Fig. 1

(Prior Art)

BAND SAW MACHINE

INCORPORATION BY REFERENCE

The following documents are incorporated herein by reference as if fully set forth: German Patent Application No. 10 2017 120 087.8, filed Aug. 31, 2017.

BACKGROUND

The present invention relates to a band saw machine for sawing metallic workpieces, and to a method for separating metal parts, produced by metal 3D printing, from a base plate.

A band saw machine of the present type accordingly comprises a lower saw part and an upper saw part, wherein normally the upper saw part is movably attached to the lower saw part, but for special applications may also be immovably fastened to the latter. The upper saw part is normally arranged above the lower saw part and, insofar as it is movably attached, can be lowered onto the lower saw part or raised from the latter in a straight line or in a swivel motion. However, the invention is not limited to the upper saw part being arranged above the lower saw p art.

Mounted in the upper saw part are at least two carrying wheels, of which at least one is driven. Carried around the carrying wheels is a saw band, which revolves with a cutting motion around the carrying wheels. Driving of the saw band for the cutting motion is effected via the driven carrying wheel. Provided in the upper saw part, between two carrying wheels, is a cutting region, through which the saw band passes with its cutting motion, and in which sawing of the metallic workpiece to be sawn is effected. For this purpose, usually, the saw band, or normally the entire upper saw part, is moved with a saw advance motion, the direction of which differs from the direction of the cutting motion and which is normally approximately perpendicular to the latter, against the workpiece. Alternatively or additionally, the workpiece may be moved against the saw band, as a result of which the saw advance motion can likewise be effected.

Attached to the lower saw part of a band saw machine of the present type is a feeding device that feeds the workpieces. By the use of this feeding device, the workpieces are transported to the cutting region of the saw band and/or into a sawing plane in which the cutting region of the saw band can be displaced for the purpose of executing the saw advance motion.

In general, in the prior art, the workpiece is fed into the sawing plane, the feed motion being effected approximately perpendicularly to the saw advance motion and, at the same time, approximately perpendicularly to the cutting motion, i.e. the workpiece is pushed by the feeding device into the sawing plane, and then the upper saw part, with the revolving saw band, is lowered onto the workpiece, such that the saw band, which is guided within the sawing plane in the cutting region, penetrates the workpiece and saws through the latter. In order to position the workpiece exactly and fix it in position for the sawing operation, the feeding device has a holder, usually including clamping jaws, for detachably fastening the workpiece. In particular, this holder is movable in order for the workpiece, following completion of a saw cut, to be displaced, usually pushed forward, to such an extent that a new saw cut can be effected. Such a band saw machine is known, for example, from DE 10 2013 210 573 A1.

Band saw machines of the present type are suitable for sawing a great variety of metal parts. Usually, long material is sawn, i.e. bars, tubes, profiles, singly or in bundles, which are normally fed on roller conveyors to the band saw machine, and positioned on a saw table, which forms the upper side of the lower saw part, for the parting-off cut.

A relatively new application is the parting-off of metal parts, produced by metal 3D printing, from the base plate, on which these metal parts have been "printed", for example by laser sintering. Such base plates typically have dimensions of 200×200 mm$^2$ to 400×400 mm$^2$, and the metal parts produced thereon are typically up to 200 mm or 400 mm in height. The actual 3D printing is effected by melting metal powder in layers, normally point-by-point or line-by-line, on the base plate. In this case, there arises the problem that the metal parts, which grow layer by layer on the base plate, are ultimately fixedly welded to the base plate. In order to separate them from the base plate, recently band saw machines of the present type are also being used.

In order to part-off metal parts, produced by metal 3D printing, from their base plate using a band saw machine such as that known, for example, from DE 10 2013 210 573 A1, the base plate must be clamped into the movable holder, realized as clamping jaws, of the feeding device, in such a manner that the base plate is oriented exactly vertically, or in a plane exactly parallel to the sawing plane. The metal parts produced thereon then extend in the horizontal direction, or perpendicularly to the sawing plane. When the base plate has been advanced by the clamping jaws to the sawing plane, the required saw cut is effected by lowering the upper saw part, in that the saw band is guided along the upper side of the base plate on which the metal parts have been printed. By this saw cut the metal parts are parted-off from the base plate.

A problem in this case, however, is that the base plate must be aligned very exactly in relation to the sawing plane, in order not to saw inadvertently into the base plate or into the metal parts; this would destroy the result of the 3D printing and produce rejects. However, a typical base plate weighs about 30 kg, and with the metal parts printed thereon has a center of gravity that is very unfavorable for exact alignment in clamping jaws. It is therefore very difficult, with a conventional band saw machine, to ensure an exact alignment of the base plate, and thereby an exact parting-off cut.

Furthermore, it is usual for not only one metal part, but a plurality of metal parts to be printed simultaneously on a base plate, which metal parts are consequently parted-off from the base plate by a single sawing operation. If the base plate is then clamped-in in a vertical orientation in a conventional band saw machine, and the sawing cut is effected with a vertical sawing plane, the metal parts that are the first to be parted-off from the base plate fall down onto those metal parts that have not yet been parted-off from the base plate. This involves the risk of damage, particularly if there are to be parted-off from the base plate metal parts having complex and fragile structures, the production of which has only been rendered possible at all by 3D printing, and for which the metal 3D printing process is primarily used. In addition, there is the risk of the saw band becoming jammed if sawn-off metal parts do not drop down, but only tilt against other metal parts that have not yet been sawn off.

SUMMARY

The present invention is therefore based on the object of modifying a band saw machine of the initially described type such that, in particular, it is better suited than previously for parting-off from the base plate metal parts produced by metal 3D printing. The present invention is additionally based on the object of providing a method for parting-off from the base plate metal parts produced by metal 3D printing, which avoids the problems stated above.

This object is achieved by a band saw machine having one or more features of the invention and by a method having also having one or more features of the invention. Preferred designs of the band saw machine according to the invention as well as an advantageous development of the method according to the invention are described below and in the claims.

The band saw machine according to the invention is accordingly for the most part of a conventional design, namely, having a lower saw part, (movably or immovably attached thereto) an upper saw part (which may be, but need not be, arranged above the lower saw part), at least two carrying wheels mounted in the upper saw part, of which at least one is driven, a saw band that revolves with a cutting motion around the carrying wheels and that passes through a cutting region, and a feeding device, attached to the lower saw part, for feeding the workpieces into the cutting region of the saw band and/or into a sawing plane, in which the cutting region of the saw band can be displaced for the purpose of executing a saw advance motion.

As known per se, the feeding device of the band saw machine according to the invention has a movable holder for detachably fastening the workpiece. According to the invention, however, this movable holder, which conventionally is formed by clamping jaws, is matched to the intended use of the band saw machine: it is realized in such a manner that it moves a workpiece fastened thereto—starting from an initial position, in which the workpiece is detachably attached to the holder, for example by clips or clamps, but preferably by screw connections—both with a translational motion and with a rotational motion, to the cutting region of the saw band and/or to the sawing plane. The translational motion and the rotational motion in this case may be effected in succession, or alternatively with a correspondingly overlaid motion.

The rotational motion of the movable holder that ultimately brings the workpiece into the position in which it is sawn means that a base plate having metal parts that have been produced on the base plate by metal 3D printing, when being attached to the holder, no longer has to be aligned exactly in a plane that is oriented in the sawing plane, or parallel to the sawing plane. Instead, it is possible, for example, to place the base plate with the metal parts present thereon—for example with crane assistance—on a holder that, in its initial position, forms a flat table. The workpiece can thus not only be placed particularly easily on the holder, but can also be detachably fastened to the latter particularly easily. Due to the rotational motion, the holder then brings the base plate into an orientation in which it is aligned exactly parallel to the cutting plane or lies exactly in the cutting plane.

Depending on whether the saw band of the band saw machine according to the invention is moved in a conventional manner, by lowering, or by swiveling the upper saw part into the cutting plane, in order to effect the saw advance motion, or whether the saw band remains fixed during the sawing operation (and executes only the cutting motion), while the workpiece is moved against the saw band within the sawing plane defined by the orientation of the saw band, and in such a manner effects the saw advance motion, the translational motion of the holder according to the invention causes the base plate, more precisely the upper side of the base plate, on which the metal parts have been printed, to come to lie exactly in the cut plane, or alternatively at least one component of the translational motion provides for the saw advance motion if such a motion is not effected by the saw band. Hybrid forms of these basic principles are also conceivable within the scope of the present invention.

The rotational motion of the holder according to the invention also makes it possible to eliminate the second main disadvantage of the prior art in sawing workpieces, produced by metal 3D printing, composed of metal parts and a base plate. If there are a plurality of metal parts printed on the base plate, which are sawn off in succession in one sawing operation, and there is the risk in this case of metal parts already sawn tilting onto metal parts not yet sawn off and causing disruption or damage, the holder may be designed such that it, as it were, turns round the workpiece, i.e. feeds it to the cutting region of the saw band, or to the sawing plane, in such a manner that the metal parts sit with a downward orientation on the base plate, the base plate in this case preferably being oriented horizontally. Metal parts that have already been sawn off thus fall downward because of gravity, without coming into contact with metal parts not yet sawn off, thereby precluding any damage and disruptions to the sawing operation.

Fixed stops, for delimiting the rotational motion of the translationally and rotationally movable holder, are preferably provided in order to ensure the exact alignment of the workpiece, in particular of a base plate having printed-on metal parts. It is thereby also ensured that, when the workpiece is being attached to the holder, no special care is required in order, for instance, for the holder not to be tipped over inadvertently. In addition, the holder may clearly also be equipped with fixed stops for the translational motion.

It is particularly preferred, within the scope of the present invention, if the holder of the feeding device is translationally movable against the cutting region of the saw band, and thereby effects the saw advance motion. This enables the upper saw part to remain immobile during the sawing cut. Especially in the sawing of workpieces that have been produced by metal 3D printing and that, due to the rotational movement, according to the invention, of the movable holder of the feeding device, are not reliant upon a vertical sawing plane, advantages ensue if the upper saw part does not have to be moved for the saw advance motion. This is because it is then possible to dispense with the deflection of the saw band before and after the cutting region, which is usual in the case of known band saw machines, and to load the saw band in the, in particular, horizontal orientation in which it revolves around the carrying wheels. As a result, during operation the saw band is loaded to a much less extent than when it has to be deflected into the sawing plane, and the service life of the saw band increases significantly.

If the saw band runs with a substantially horizontal orientation in the cutting region, it is preferred if the holder of the feeding device, before execution of the saw advance motion, is rotatable about a likewise substantially horizontal rotational axis, namely by 180 angular degrees. The latter offers advantages because the workpiece, in particular the base plate with printed-on metal parts, can then simply be placed upon the holder from above, the latter being in the initial position.

The vertical mobility of the upper saw part that is normally present in the case of band saw machines of the present type can be used in this case to adjust the height of the saw cut. This is quite advantageous, because base plates for metal 3D printing are used multiple times. For this purpose, before a new printing, their surface, on which the metal parts are printed, is ground, as a result of which the material thickness of the base plate is reduced slightly in each case. Without the necessity of altering the holder and its motion path, which is preferably delimited by fixed stops, in this preferred design the band saw machine according to the invention can then be adapted to differing base plate thicknesses, in that the upper saw part is readjusted accordingly.

This preferred design of the band saw machine according to the invention is not limited to exactly horizontal and vertical directions; instead, the saw band may also be oriented at an angle to the horizontal, such that the sawing plane changes accordingly, and the translational motion of the holder with which the saw advance motion is effected likewise runs at a corresponding angle to the horizontal, in order to remain in the sawing plane.

If the movable holder according to the invention, for receiving a base plate of a workpiece produced by metal 3D printing, having metal parts printed on the base plate, is provided, and in particular is realized as a table, it is preferred if the holder has a rotary table, which is mounted on a substantially horizontally positionable slide. This slide is responsible for the translational motion, while the rotary table executes the rotational motion. Such a design of the holder enables, in particular, the preferred fixed stops to be provided in a simple manner.

A further aspect of the present invention solves a further problem that ensues in the sawing of workpieces that have been produced by metal 3D printing:

In the case of metal 3D printing, in particular in the case of laser sintering, the metal parts that are to be printed onto the base plate are produced by point-by-point and layer-by-layer melting of metal powder that has been applied beforehand to the base plate. 3D printing processes are used especially for producing metal parts having unusual shapes that cannot be produced as a single piece by conventional manufacturing methods, in particular because they have undercuts. Depending on the shape and extent of the undercuts, cavities are produced between the base plate and the printed-on metal parts, which cavities are opened by the parting-off of the metal parts from the base plate. In this case, the non-melted metal powder that is still present is released. Corresponding effects are to be observed if metal parts having support structures are produced on the base plate by 3D printing. Such support structures are also opened during the sawing operation, and metal powder still present therein is released.

The metal powders used for the metal 3D printing process have a typical particle size of 40 μm. This results in the large problem of a health hazard to operating personnel, since metal particles of these dimensions can be inhaled, but are too small to be conveyed back out of the lung by the lung cilia. In the parting-off of metal parts from their base plate, it is therefore essential to provide dust-tight protective suits, having a separate respiratory air supply, for the operating personnel.

To solve this problem, it is provided, within the scope of the present invention, to provide the band saw machine according to the invention, i.e. the upper saw part and the lower saw part together with the feeding device, with a housing that is preferably to be closed in a dust-tight manner, and/or with such a covering. In addition, at least one suction extraction system may be provided for the interior of the housing and/or of the covering, which suction extraction system is expediently arranged as close as possible to the cutting region, and extracts by suction any dusts at the site of release.

In particular, in the case of the preferred design of the band saw machine according to the invention having a substantially fixed upper saw part, such an encapsulation of the entire band saw machine can be effected in an inelaborate manner. The preferred, or intended, use of the band saw machine, for parting-off metal parts, produced by metal 3D printing, from their base plate also lends itself to encapsulation of a band saw machine, since then the workpieces to be sawn are not long material that has to be fed, for example, by a conveyor, but instead there is normally single-piece feeding of the workpieces, which moreover are of comparatively compact dimensions, typically not more than a cube having an edge length of 400-500 mm.

In particular, in the case of the intended use of the band saw machine according to the invention for 3D printed workpieces, it is preferred to provide the housing that is to be closed in a dust-tight manner, and/or the corresponding covering, with doors and/or flaps that enable workpieces or workpiece parts to be inserted and/or removed by a crane.

BRIEF DESCRIPTION OF THE DRAWINGS

An exemplary embodiment of a band saw machine designed according to the invention, the intended operation of which is also an exemplary embodiment of a method according to the invention, is described and explained in greater detail in the following on the basis of the appended drawings. Shown are.

DETAILED DESCRIPTION

Figure 1:
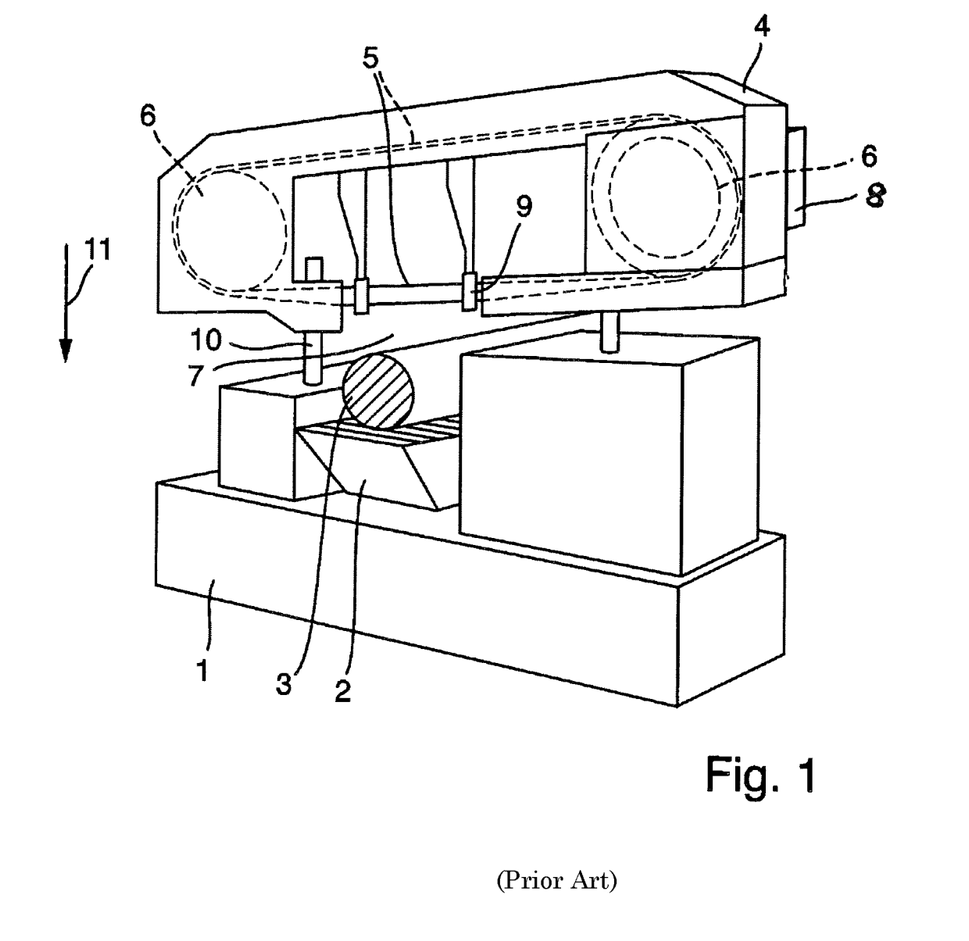
FIG. 1 a schematic representation of a band saw machine according to the prior art.

Represented schematically in FIG. 1 is a band saw machine such as that known per se from the prior art. It comprises a lower saw part 1 with, attached thereon, a saw table 2 for a workpiece 3 to be sawn, and an upper saw part 4, which is movable relative to the lower saw part 1 and in which a saw band 5 revolves endlessly about two carrying wheels 6. One of the two carrying wheels 6 is driven by a motor 8, such that the saw band 5 executes a revolving cut motion.

The saw band 5 is oriented vertically in a cutting region 7, such that it lies in a sawing plane. For this purpose it is turned by 90° by two band guides 9 at the start and end of the cutting region 7, since otherwise it revolves in a horizontal orientation around the carrying wheels 6. The upper saw part 4 is movably attached to the lower saw part 1 by pillar guides 10, and lowering of the upper saw part 4 causes the cutting region 7 of the saw band 5 to shift vertically downward, in order to execute a saw advance motion 11. The plane within which the cutting region 7 of the saw band 5 moves in the saw advance motion 11 is the sawing plane.

Figure 2:
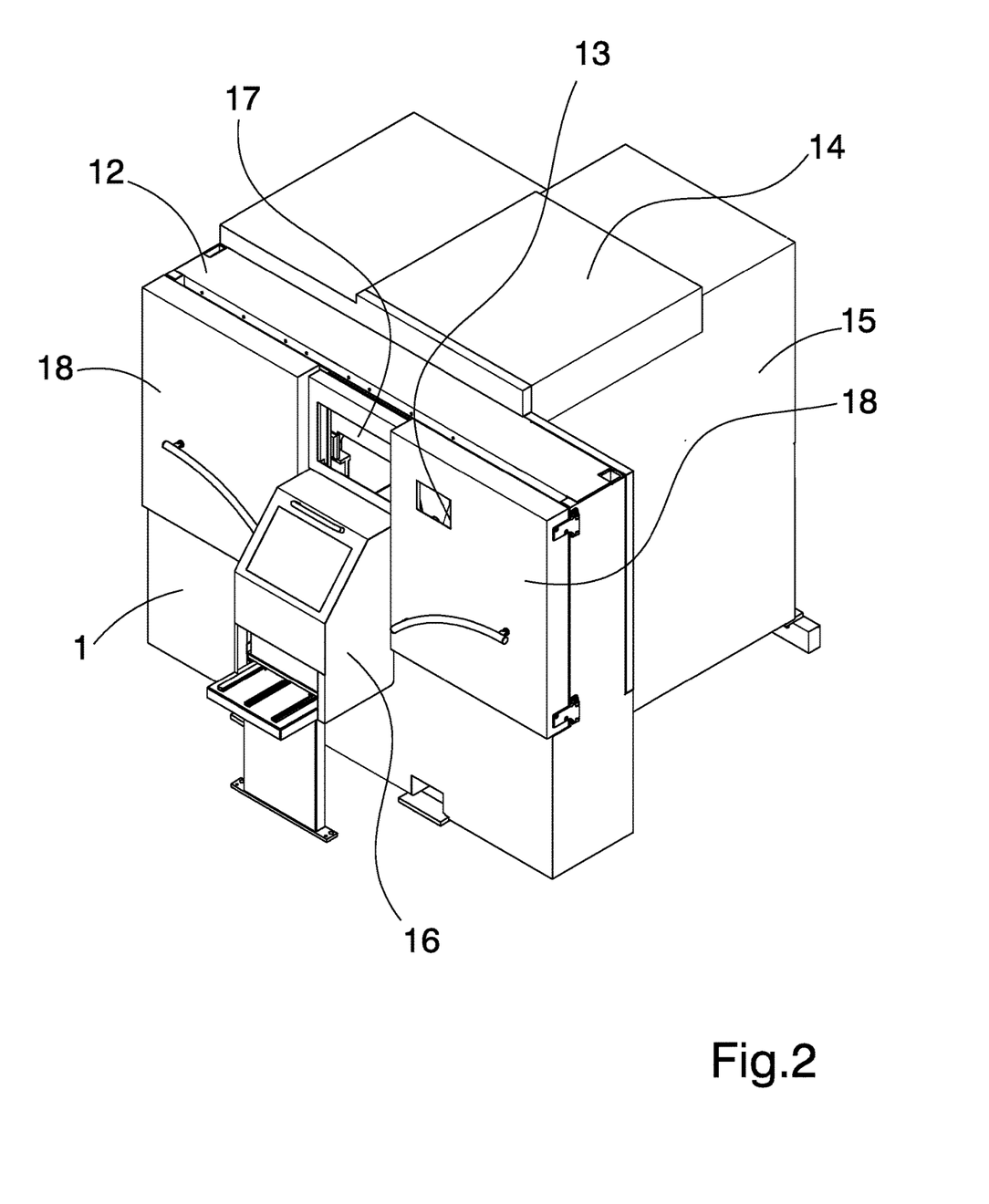
FIG. 2 a band saw machine designed according to the invention, in an isometric representation.

FIG. 2 shows an isometric view of a band saw machine designed according to the invention, the latter encapsulated all round in a dust-tight manner by means of a housing 12. An operator panel 13 enables the band saw machine to be operated from outside the housing 12.

The elements present inside the band saw machine represented here correspond largely to the elements represented in FIG. 1, but with the omission of a turning of the saw band 5 in the cutting region 7. Instead, in the cutting region 7 the saw band 5 maintains its horizontal orientation, and the saw advance motion is effected, not by lowering of the upper saw part 4, but by a translational motion of the workpiece 3, for which reason the saw table 2 has also been omitted.

The band saw machine represented in FIG. 2 is loaded via a sliding roof 14 and a side door 15, and the said workpiece parts are removed forwardly, via a flap 16. A viewing window 17 enables on-site monitoring, and on the front side two front doors 18 are provided to enable the machine to be serviced.

The encapsulation of the band saw machine indicated in FIG. 2 prevents metal dusts that are harmful to health from passing into the environment. Additionally provided, at the band guides 9, is a suction extraction system (not represented), for directly extracting by suction, for instance, metal dusts released during sawing.

FIGS. 3 to 7 show the band saw machine from FIG. 2 in a different view, the side door 15 and the sliding roof 14 having been opened for loading the band saw machine, and affording a view of a feeding device.

Figure 3:
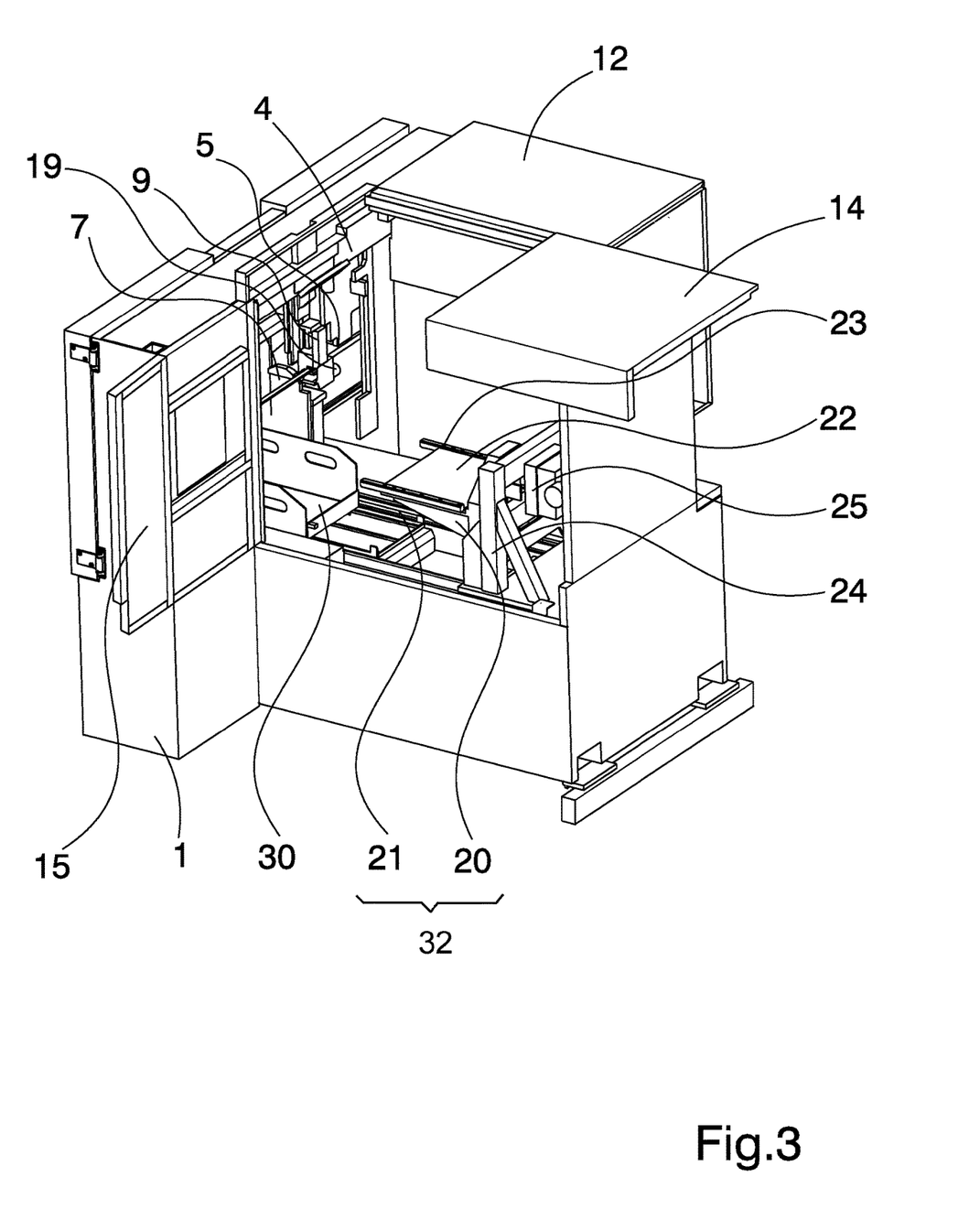
FIGS. 3 to 8 the band saw machine from FIG. 2, at differing time points in a sawing operation.

Furthermore, in FIG. 3 the lower saw part 1 and the upper saw part 4 can be seen. Also visible is the saw band 5, which in this case runs through the cutting region 7, one end of which is marked by a band guide 9 that is visible here. This band guide 9 is provided with a suction extraction means 19. The band guide 9 does not turn the saw band 5 to a vertical orientation; instead, the saw band remains in a horizontal orientation, such that it does not effect a saw advance motion, but an upward and downward motion of the upper saw part 4 enables only the horizontal position of the sawing plane to be adjusted. The carrying wheels, together with the motor, are not visible in the housing 12 in this case.

In the present exemplary embodiment, the feeding device 32 is comprised of a movable holder 20 and two rails 21 that are fixedly attached to the lower saw part 1. The holder 20, for its part, comprises a rotary table 22 having two thread rows 23, which is fastened, so as to be rotatable about a horizontal axis, to a slide 24. The slide 24 can be moved back and forth along the rails 21, such that it can effect the saw advance motion toward the saw band 5. The rotation of the rotary table 22 on the slide 24 is effected by a motor that drives a rotatable mounting 25, and the rotary motion is delimited by fixed stops.

FIGS. 4 to 7, in a representation corresponding to FIG. 3, show differing time points during the sawing of a workpiece 3, which is composed of a base plate 26 and of metal parts 27, represented only symbolically here, produced thereon by metal 3D printing and welded to the base plate 26. The upper side 28 of the base plate 26, on which the metal parts 27 have been printed, and along which is to be sawn, is indicated by a dark line. The workpiece 3 composed of a base plate 26 and metal parts 27 has been placed on the rotary table 22 by a crane.

Figure 4:
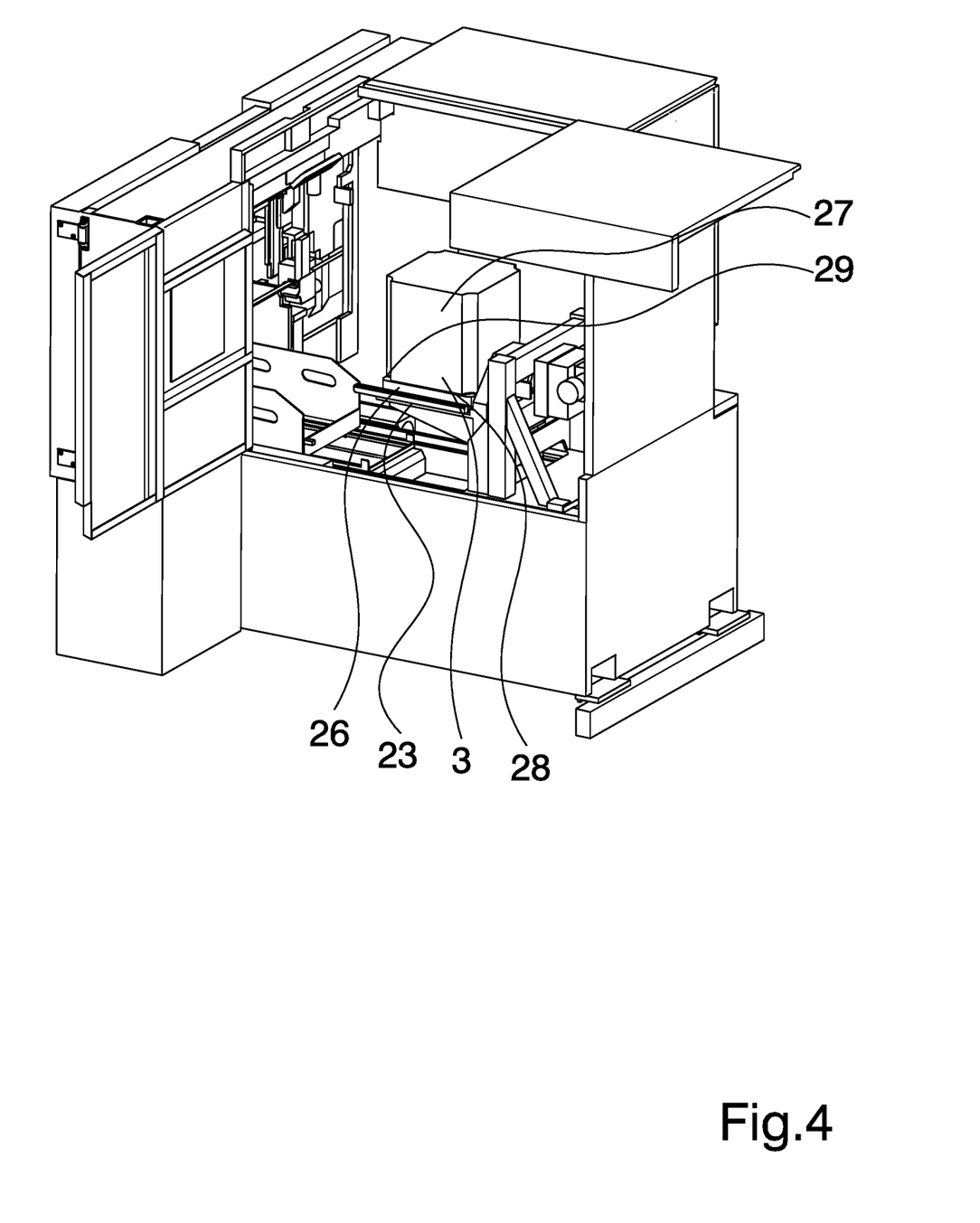

In its corners, the base plate 26 is provided with screws 29, which can be screwed into the thread row 23 in order to fasten the base plate 26 on the rotary table 22. The workpiece 3 is thus detachably fastened to the holder 20.

Figure 5:
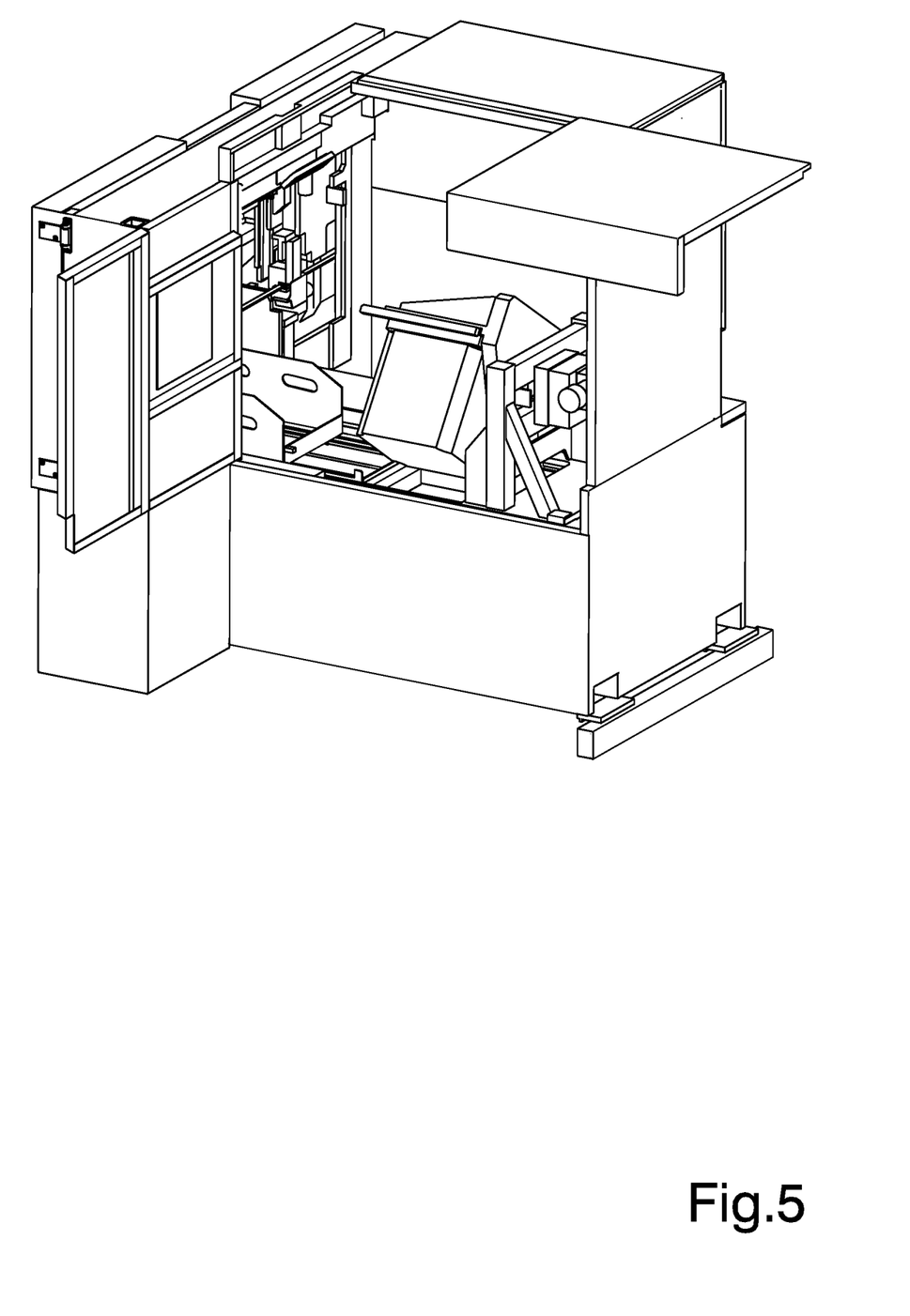
Figure 6:
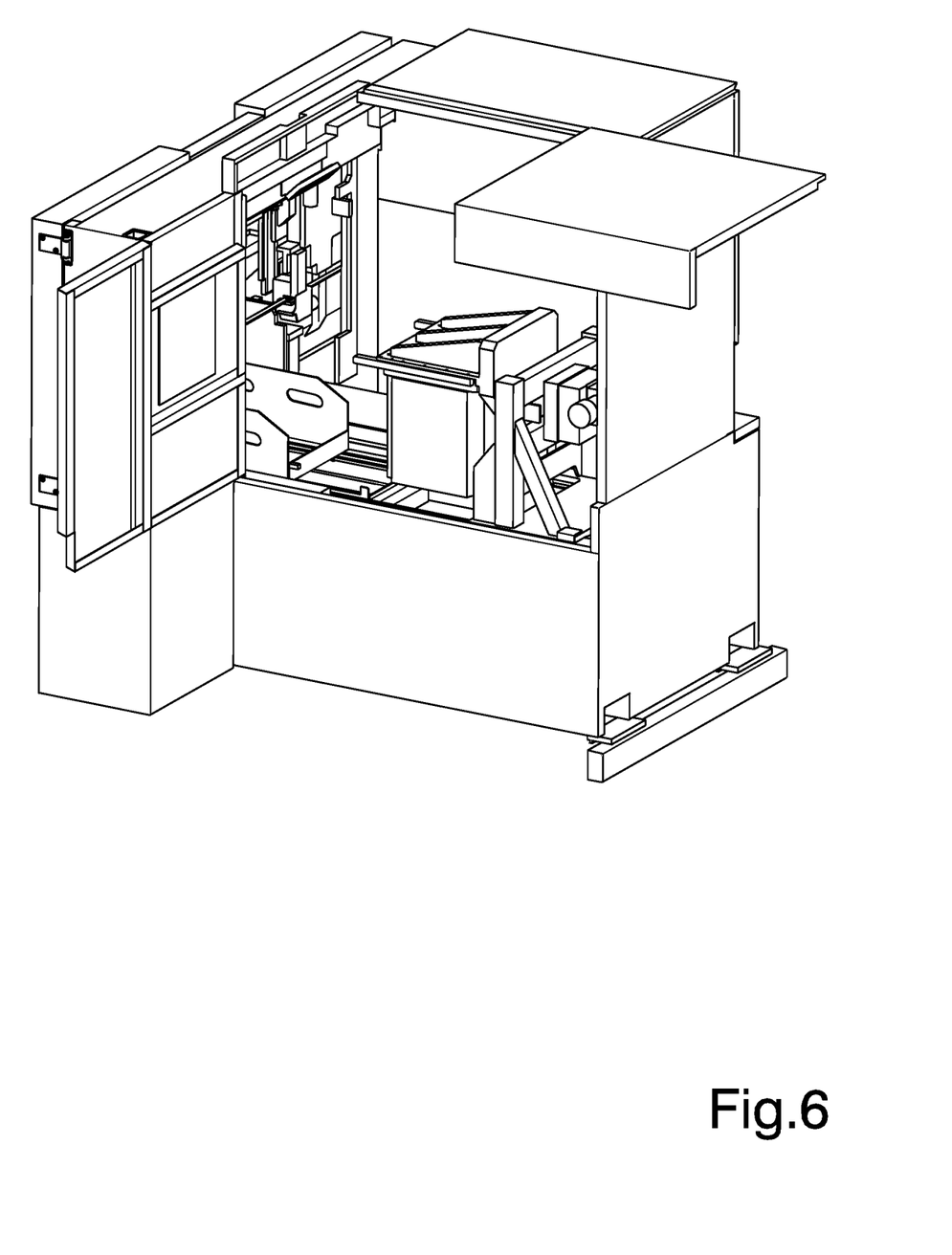

A rotation of the rotary table 22, as represented in FIG. 5, causes the workpiece 3 to be brought into a position in which the base plate 26 is aligned horizontally and lies exactly in the sawing plane, which is defined by the orientation of the saw band 5 in the cutting region 7, and in which the metal parts 27 hang with a downward orientation on the base plate 26 (FIG. 6).

Figure 7:
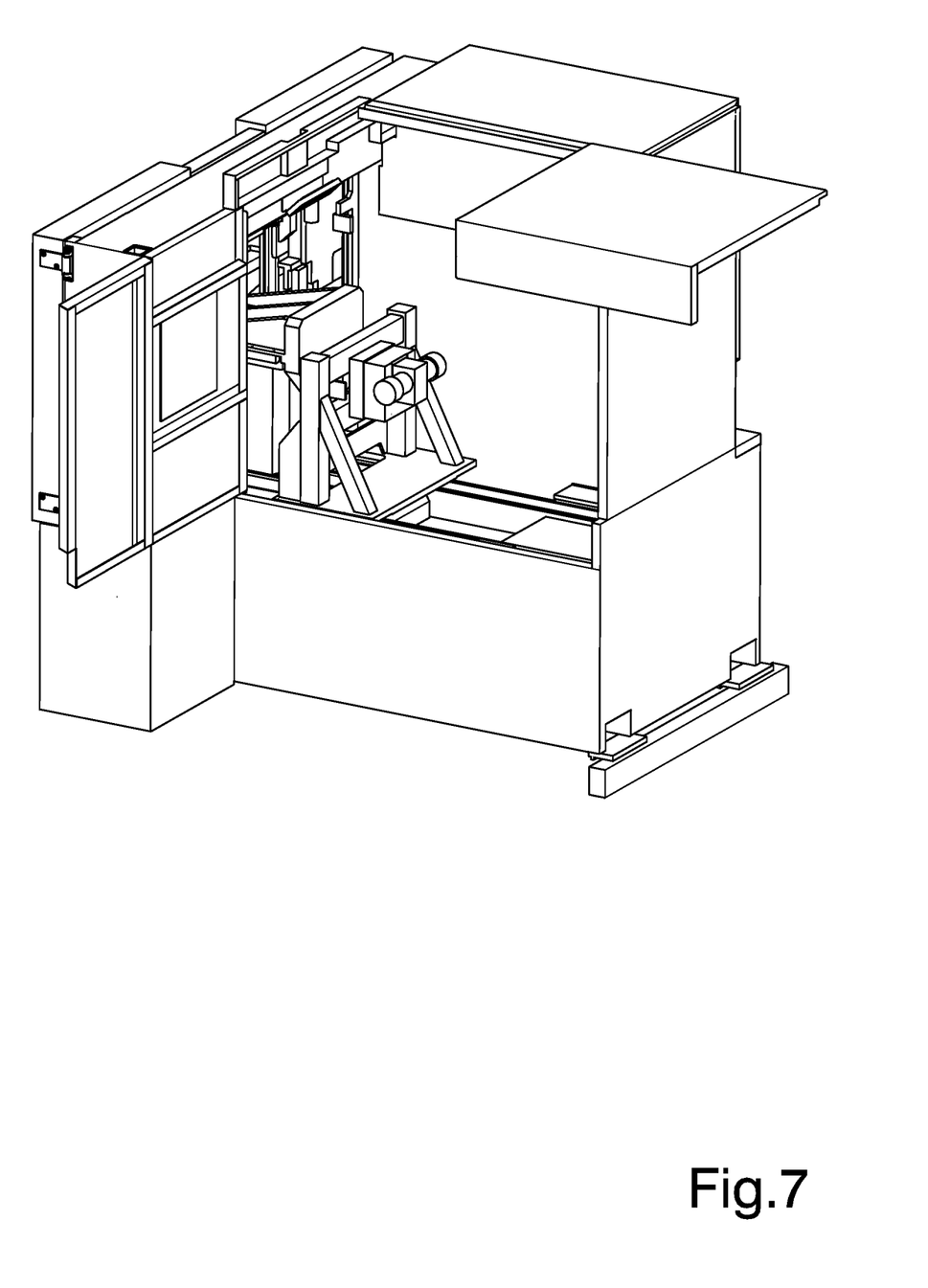

Following this rotational motion, a translational motion of the holder 20 is effected, in that the slide 24 moves forward, along the rails 21, against the saw band 5. This operation is shown by FIG. 7. In this case the saw band 5 in the cutting region 7 penetrates the workpiece 3 and parts off the base plate 26 from the metal parts 27, along the upper side 28.

Figure 8:
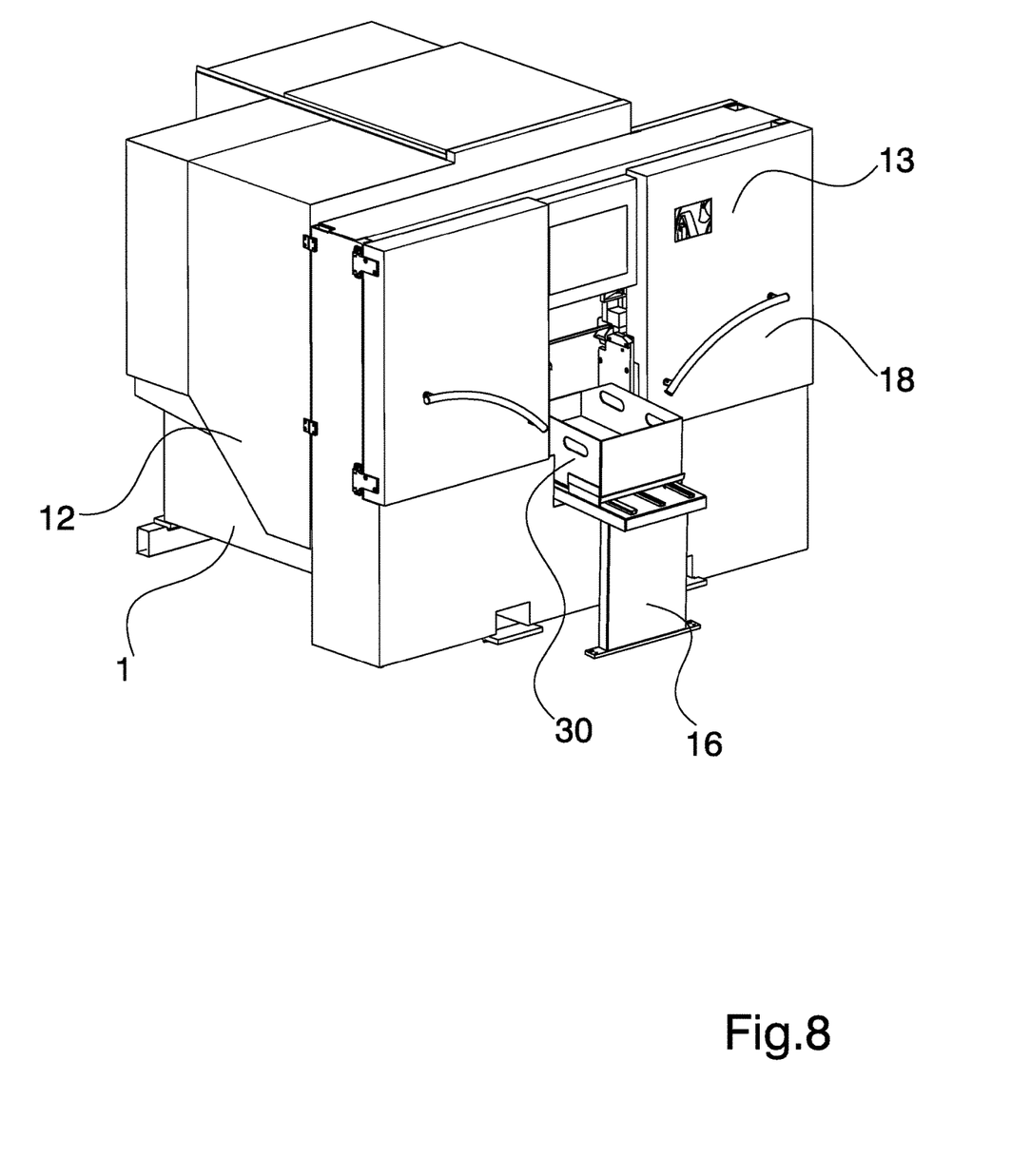

The sawn-off metal parts fall downward into a collecting tray 30, which can be seen in FIGS. 3 to 6, and in particular in FIG. 8. FIG. 8 shows the present exemplary embodiment of a band saw machine according to the invention again from the front, namely following completion of the sawing operation. The flap 16 has been opened, and the collecting tray 30 has been pulled forward on the flap 16, out of the housing 12. The sawn-off metal parts 27 lie in the collecting tray 30, from which they can be removed or transported away together with the collecting tray 30.

The base plate 26 naturally remains on the holder 20 and is moved back together with the latter, such that, following opening of the side door 15, it is released from the thread row 23 of the rotary table 22 and can be removed for re-use.

The particular advantage of the exemplary embodiment represented in the figures consists in that a conventional band saw machine according to the prior art has been designed according to the invention with relatively few modifications, which relate substantially only to the feeding device—as a result of which major advantages ensue in the sawing of workpieces that have been produced by metal 3D printing. This is because, as already described above, the design of the band saw machine according to the invention eliminates the problems that occur in the sawing of such workpieces by means of conventional band saw machines.

The invention claimed is:

1. A band saw machine for sawing metallic workpieces, comprising:
    a lower saw part (1);
    an upper saw part (4) attached to the lower saw part;
    at least two carrying wheels (6) mounted in the upper saw part (4) with at least one of the two carrying wheels being driven;
    a saw band (5) that revolves with a cutting motion around the carrying wheels (6) and that passes through a cutting region (7);
    a feeding device attached to the lower saw part (1) that is adapted to feed the workpieces (3) to at least one of the cutting region (7) of the saw band (5) or into a sawing plane in which the cutting region (7) of the saw band (5) is displaceable to execute a saw advance motion (11), the feeding device including a movable holder (20) for detachably fastening the workpiece (3);
    wherein
    the movable holder (20) of the feeding device, starting from an initial position, is movable both with a translational motion and with a rotational motion to at least one of the cutting region (7) of the saw band (5) or the sawing plane;
    the movable holder (20) of the feeding device is movable translationally against the cutting region (7) of the saw band (5) for executing the saw advance motion; and
    the saw band (5) runs with a substantially horizontal orientation in the cutting region (7), and the movable holder (20) of the feeding device, before execution of the saw advance motion, is rotatable about a substantially horizontal rotational axis as part of the rotational motion.

2. The band saw machine as claimed in claim 1, wherein the holder (20) of the feeding device in an initial position is oriented upward, in order to place the workpiece on or into the holder (20) from above, and the holder (20), before execution of the saw advance motion, is rotatable about a substantially horizontal rotational axis, such that the holder (20) is oriented downward during the saw advance motion.

3. The band saw machine as claimed in claim 2, the saw band (5) runs through the cutting region (7) substantially in a same orientation in which it revolves around the carrying wheels (6).

4. The band saw machine as claimed in claim 2, wherein the holder (20) in the initial position is adapted to be loaded from above with a workpiece (3).

5. The band saw machine as claimed in claim 4, wherein the holder (20) comprises a table that is adapted to receive a base plate (26) of a workpiece (3) produced by metal 3D printing provided with metal parts (27) printed on the base plate (26).

6. The band saw machine as claimed in claim 5, wherein the table is a rotary table (22), which is mounted on a substantially horizontally positionable slide (24).

7. The band saw machine as claimed in claim 1, wherein the upper saw part (4) is guidably movable relative to the lower saw part (1).

8. The band saw machine as claimed in claim 1, wherein the upper saw part (4) and the lower saw part (1) together with the feeding device are provided with a housing (12).

9. The band saw machine as claimed in claim 8, further comprising a suction extraction system (19) for an interior of the at least one of the housing (12) or of the covering.

10. The band saw machine as claimed in claim 8, wherein the at least one of the housing (12) or the covering includes at least one of doors (15) or flaps (16) that enable workpieces (3) or workpiece parts to be at least one of inserted or removed by a crane.

11. A method for parting-off metal parts (27), produced by metal 3D printing, from a base plate (26), on the upper side (28) of which the metal parts (27) have been printed, the method comprising:
providing the band saw machine as claimed in claim 1;
detachably fastening the base plate (26) to the movable holder (20) of the feeding device;
moving the holder (20) into at least one of the cutting region (7) of the saw band (5) or the sawing plane such that the sawing plane runs along the upper side (28) of the base plate (26);
placing the base plate (26) on or into the holder (20) substantially from above and fastening the base plate (26) to the holder (20);
and moving the holder (20) both with a translational motion and with a rotational motion to the cutting region (7) of the saw band (5) or the sawing plane, such that, during the sawing operation, the base plate (26) is held vertically or such that the upper side (28) is oriented downward.

12. The method as claimed in claim 11, wherein the holder (20), with the base plate (26), is rotated by 180 angular degrees by the rotational motion, and is moved by the translational motion against the cutting region (7) of the saw band (5) to such an extent that the saw advance motion results therefrom.

* * * * *